（12）United States Patent
Demmer et al.

(10) Patent No.: US 7,390,409 B2
(45) Date of Patent: Jun. 24, 2008

(54) MEMBRANE HOLDER FOR MEMBRANE ADSORBER CHROMOTOGRAPHY

(75) Inventors: Wolfgang Demmer, Göttingen (DE); Rene Faber, Göttingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 266 days.

(21) Appl. No.: 11/454,047

(22) Filed: Jun. 15, 2006

(65) Prior Publication Data

US 2007/0006734 A1 Jan. 11, 2007

(30) Foreign Application Priority Data

Jul. 6, 2005 (DE) .................. 10 2005 031 560

(51) Int. Cl.
*B01D 63/00* (2006.01)
*B01D 15/08* (2006.01)

(52) U.S. Cl. .................. 210/321.84; 210/198.2; 210/321.6; 96/4; 96/101

(58) Field of Classification Search .......... 96/101, 96/4, 7, 11; 210/198.2, 656, 321.6, 321.64, 210/321.84

See application file for complete search history.

(56) References Cited

U.S. PATENT DOCUMENTS

| 4,895,806 | A | | 1/1990 | Le et al. | |
|---|---|---|---|---|---|
| 4,935,142 | A | * | 6/1990 | Sternberg | 210/634 |
| 5,575,910 | A | * | 11/1996 | Karbachsch et al. | 210/321.75 |
| 5,618,418 | A | | 4/1997 | Demmer et al. | |
| 5,711,867 | A | * | 1/1998 | Przybycien et al. | 205/688 |
| 6,736,973 | B1 | * | 5/2004 | Podgornik et al. | 210/656 |
| 2005/0211615 | A1 | * | 9/2005 | DiLeo et al. | 210/198.2 |
| 2005/0211616 | A1 | * | 9/2005 | DiLeo et al. | 210/198.2 |

FOREIGN PATENT DOCUMENTS

DE 44 32 628 A1 3/1996

OTHER PUBLICATIONS

Vivapure Ion Exchange Protein Purification Products.

* cited by examiner

*Primary Examiner*—Duane Smith
*Assistant Examiner*—Robert A Clemente
(74) *Attorney, Agent, or Firm*—Anthony J. Casella; Gerald E. Hespos

(57) ABSTRACT

Membrane holder for membrane adsorber chromatography comprising a housing body (12) with a reception space for at least one layer of adsorber membranes (22) and at least one first housing cap (34) for closing a first reception space opening, which can be fixed to the housing body (12), a liquid stream being introducible via first liquid guide means (36) through the first housing cap (34) and the first reception opening into the reception opening, so that it passes through the adsorber membranes (22) and flows away through a second reception space opening. The first housing cap (34) can be screwed as a first union nut onto the housing body (12) and a first brace element (24), which can be clamped between the first cap (34) and the housing body (12) via a flange (32) extending beyond the first reception space opening, can be fixed leaktightly in a basket-like insert (14) with a liquid-tight wall and a perforated bottom (18), which is used to receive the adsorber membranes (22). The outer contour of the basket-like insert (14) being fitted in a leaktight fashion onto an inner contour of the reception space.

12 Claims, 1 Drawing Sheet

MEMBRANE HOLDER FOR MEMBRANE ADSORBER CHROMOTOGRAPHY

BACKGROUND OF THE INVENTION

1. Field of the Invention

The invention relates to a membrane holder for membrane adsorber chromatography comprising a housing body with a reception space for at least one layer of adsorber membranes and at least one first housing cap for closing a first reception space opening, which can be fixed to the housing body, a liquid stream being introducible via first liquid guide means through the first housing cap and the first reception opening into the reception space, so that it passes through the adsorber membranes and flows away through a second reception space opening.

2. Description of the Related Art

Membrane adsorber chromatography is widely used both on the laboratory scale and in order to obtain substances in a production process. It is used for the selective separation of substances from a liquid. The basic principle of membrane adsorber chromatography resides in passing a liquid, which contains the substances to be separated, generally through a stack of flat pieces (layers) of porous membrane adsorber material, hereafter abbreviated to adsorber membrane or membranes, which have a selective or preferably specific adsorptivity for the substances to be separated.

According to WO-A1-92/00805 (Sartorius A G), by porous membrane adsorbers is meant those membranes which carry functional groups, ligands or reactants on their surface which are capable of interacting with at least one substance of a liquid phase placed in contact with them. The transport of the liquid phase through the membrane takes place convectively. The term adsorber membrane will be used in the scope of the present invention as a generic term for flat pieces of various types of membrane adsorbers, such as membrane ion exchangers, ligand membranes and activated membranes, which are in turn subdivided into different membrane adsorber types according to the functional groups, ligands and reactants.

Membrane adsorber chromatography is usually carried out as a multistage method, the liquid to be purified being passed through an adsorber membrane stack with the desired adsorption properties in a first step; in a subsequent step, the adsorber membrane stack is flushed with an eluent so that the target substances adsorbed on the membrane are released from the membrane. The resulting eluate, which contains substances to be separated from the original liquid, can then be sent to further treatment or processing steps.

On the laboratory scale, these steps are usually carried out with the aid of the centrifuging technique. For instance, basket-like membrane holder inserts named Vivapure™ for standard centrifuging vessels are known from Vivascience, Hanover. The Vivapure™ inserts have a liquid-tight wall and a perforated bottom, on which an adsorber membrane stack is arranged preferably with wall contact at the stack circumference. In order to fix the adsorber membrane stack or the at least one layer, a hollow cylinder is pressed into the insert above the stack, the outer diameter of the hollow cylinder being dimensioned so that friction with the wall of the insert ensures axial fixing, while the inner diameter of the hollow cylinder is selected to be less than the diameter of the membrane stack so that the latter can be clamped between the hollow cylinder and the bottom of the insert.

After the insert has been introduced into the centrifuging vessel, the insert is filled up to the intended filling level with the liquid to be purified, and then centrifuged, the liquid being pressed through the membrane stack owing to the centrifugal force and flowing out into a lower region of the centrifuging vessel through the perforated bottom of the insert. The subsequent elution step is carried out similarly.

Application of the centrifuging technique has the disadvantage that the pressure with which the liquid is pressed through the membrane stack is set up only by the centrifugal force, which can be controlled only coarsely, so that the pressure actually applied to the membrane stack can be specified only with difficulty or inaccurately. This leads to acceptance problems of the results achieved by the described method with standardization and approval authorities.

The principle of flow membrane adsorber chromatography is known in the field of production, in which case the adsorber membrane stack is integrated in a line system and flowed through for a defined time under defined pressure conditions, which are defined by corresponding pump means. A membrane holder for such a flow system is known from U.S. Pat. No. 4,895,806. This document discloses a membrane holder which is filled with a membrane adsorber stack, sealing rings that are in tight contact with the cylindrical housing body being fitted respectively between packets of a plurality of membrane layers and at the end of the stack. Housing caps, which on the one hand close the reception space inside the housing body and on the other hand compress the membrane stack, are provided above and below the cylindrical housing body. The housing caps are respectively provided with feed and discharge channels. Such a membrane holder is highly suitable for application on the production scale, i.e. with large throughput volumes and correspondingly large diameters of the membrane stacks, so that the unusable dead volume due to the sealing rings at the end of the stacks is negligibly small compared to the membrane surface actually used.

DE 44 32 628 A1 discloses another membrane holder in which the individual membranes, of which the stack is comprised, are configured to be liquid-impermeable in their edge region. Compared with the approach discussed above, this approach avoids the need to use separate sealing rings. A disadvantage, however, is the increased outlay that is required in order to produce the individual membranes. There is furthermore a similar problem as described above in respect of the aforementioned dead volume.

It is an object of the present invention to provide a membrane holder which is suitable for flow chromatography on a small scale and in which, particularly, the dead volume is minimized.

SUMMARY OF THE INVENTION

This object is achieved in conjunction with a membrane holder for membrane adsorber chromatography in that a first housing cap can be screwed as a first union nut onto the housing body and a first brace element, which can be clamped between the first cap and the housing body via a flange extending beyond the first reception space opening, can be fixed leaktightly in a basket-like insert with a liquid-tight wall and a perforated bottom, which is used to receive the adsorber membranes, an outer contour of the basket-like insert being fitted in a leaktight fashion onto an inner contour of the reception space.

It is a fundamental idea of the invention to make the advantages of the known Vivapure™ inserts usable for flow chromatography as well. To this end, the subject invention provides an adapter, referred to as a membrane holder, in whose reception space the basket-like insert can be fitted leaktightly. The basket-like insert is fixed by means of a brace element, which can be fixed using the union nut that can be screwed onto the housing body. Since sealing is also provided between the basket-like insert and the brace element, it is not necessary for the housing caps designed as union nuts to be designed leaktightly. It is therefore possible to form a comparatively coarse and cost-effectively producible screw connection between the housing cap and the housing body.

The brace element is expediently designed so that it protrudes far into the basket-like insert. On the one hand, this reduces the volume above the adsorber membranes; on the other hand, with suitable adaptation of its length to the height of the stack of adsorber membranes in the basket-like insert, the brace element can be used to fix and press the membrane stack. This can obviate the otherwise customary aforementioned use of a hollow cylinder pressed into the insert for fixing the membrane stack. If the diameter of the brace element is correspondingly smaller, it is of course also possible to use the commercially available inserts, including the hollow fixing cylinder.

In order to create the seal between the basket-like insert and the brace element, a circumferential flange is favorably provided on the basket-like insert's upper edge facing away from the bottom, against which a corresponding shoulder of the first brace element exposed to force from the first housing cap bears leaktightly. The seal may optionally be optimized by an additional sealing element, which is arranged between the flange and the shoulder of the first brace element. When a sealing element is used, the insertion depth of the brace element into the basket-like insert can also be influenced via its thickness, so that different membrane stack heights can be used together with the same brace element.

The wall of the basket-like insert is preferably designed as a hollow cylinder with a first, smaller cylinder diameter in a lower section, next to the perforated bottom, and as a hollow cylinder with a second, larger cylinder diameter in an upper section, which neighbors the lower section via a wall shoulder. This corresponds to the commercially available form of the aforementioned Vivapure™ elements, and has the advantage that the outer side of the wall shoulder can be employed particularly favorably, optionally by using an additional sealing element, for external sealing of the insert against a corresponding shoulder of the wall of the reception space of the housing body.

In this embodiment, as an alternative or in addition to the aforementioned inner sealing of the brace element against the basket-like insert, a seal may also be created between the brace element and the basket-like insert in that a corresponding shoulder of the first brace element, exposed to force from the first housing cap, bears leaktightly against the wall shoulder, i.e. here against its inner side.

So that the delivery of liquid required for flow chromatography can be made particularly advantageous, according to a favorable refinement of the invention an outer end region of the first brace element passes through the first housing cap in the assembled state, and the first liquid guide means pass in the form of a feed channel through the first brace element. Preferably, the outer end region of the first brace element also has a tube or hose connection. In this way, it is possible for all the intricate elements or features, which require tuning, to be integrated into the brace element. Various brace elements with different lengths, different feed channel diameters and different connection standards for tube or hose connections can thus be produced and selected according to the application, while the same easily and cost-effectively producible housing bodies, housing caps and basket-like inserts can still be used in every case.

According to a particularly preferred refinement of the invention an inner end region of the first brace element, facing away from the outer end region, has a liquid distribution structure for distributing the introduced liquid stream over a substantial part of the adsorber membrane surface. Such a liquid distribution structure may be produced as a conical recess, for example, in which case the feed channel opens into the cone vertex. As an alternative or in addition, the feed channel may open into a distribution channel arrangement buried in the end face of the inner end region, in which case there may be a multiplicity of open and straight or curved or helical channels, optionally branched one or more times. The advantage of such a structure is that the entire membrane surface, or at least the majority of it, can be used for the chromatography and that it avoids the liquid to be purified penetrating into the membrane stack only in the region of the feed channel outlet, which would lead to rapid occupation of the binding sites in the central region of the membrane and could make the purification inefficient insofar as large numbers of unoccupied binding sites still remain in the edge regions of the membrane stack.

According to a preferred refinement of the invention, the reception space has a second section following on from its first section receiving the basket-like insert, which is connected to the first section and into which a second brace element can be fitted leaktightly, the second brace element being clampable by means of a second housing, designed as a second union nut, which can be screwed onto the housing body in order to close the second reception opening, between the second housing cap and the housing body in cooperation with a flange of the second brace element, which extends beyond the second reception space opening. This functionally symmetric structure of the membrane holder according to the invention allows the advantages explained above in connection with the liquid feed also to be used in the liquid discharge. By using a brace element, on the one hand a good seal of the second reception space section can be ensured while at the same time minimizing the dead volume in the discharge path.

For particularly cost-effective production, the second housing cap may be designed as a union nut which is identical to the union nut used as the first housing cap. Correspondingly, the housing body must be provided with essentially identical screw-threaded sections in the region of both reception space openings. This is easy to achieve mechanically.

An outer end region of the second brace element favorably passes through the second housing cap in the assembled state, and second liquid guide means pass in the form of a discharge channel through the liquid brace element. The outer end region of the second brace element has a tube or hose connection. The effect and advantages of this configuration are similar to those of the aforementioned preferred configuration of the first brace element. Here again, it is possible for all the intricate features, which may need to be varied application-specifically, to be concentrated in the brace element so that all the other elements of the membrane holder according to the invention can be produced cost-effectively and without great manufacturing outlay.

In order to optimize the efflux of the purified liquid or the eluate during the elution step, and particularly in order to avoid undesired turbulence which hinders the efflux, according to a refinement of the invention an inner end region of the second brace element, facing away from the outer end region, may have a liquid manifold structure for collecting the liquid emerging from the adsorber membrane surface.

The membrane holder according to the invention therefore not only allows efficient scale-down of flow chromatographic methods from the production scale to the laboratory scale, but can also be produced and used in advantageous embodiments according to a modular principle, with only the brace element requiring precision processing while the other elements, in particular housing bodies and housing caps, can be produced cost-effectively without great manufacturing outlay. The user can always use the same components and only has to select a suitable brace element as a function of their application, particularly with a view to membrane stack height, flow quantity or rate and connection standard.

Other features and advantages of the present invention will be found in the following special description and the drawings.

DETAILED DESCRIPTION OF THE PREFERRED EMBODIMENT

Figure 1:
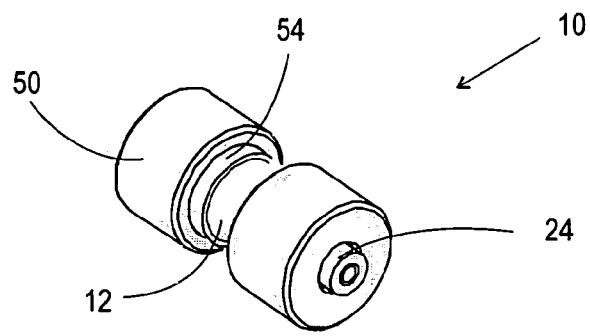
FIG. 1 shows a perspective representation of an assembled membrane holder according to the present invention.
Figure 2:
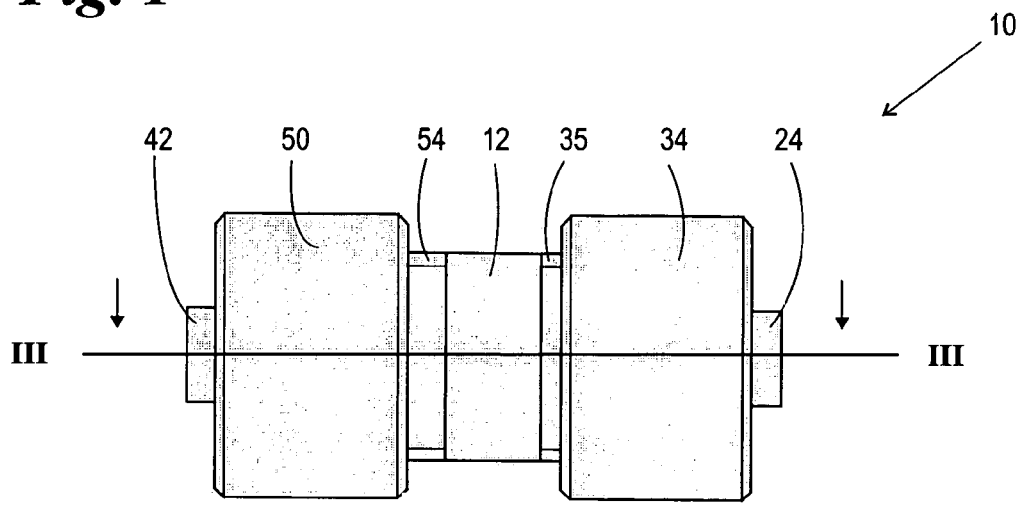
FIG. 2 shows an elevation of the membrane holder of FIG. 1.

In order to describe a particularly preferred embodiment of the invention, reference will be made in particular to FIG. 3. This also provides incidentally an understanding of FIGS. 1 and 2, in which the same references are used for identical components.

Figure 3:
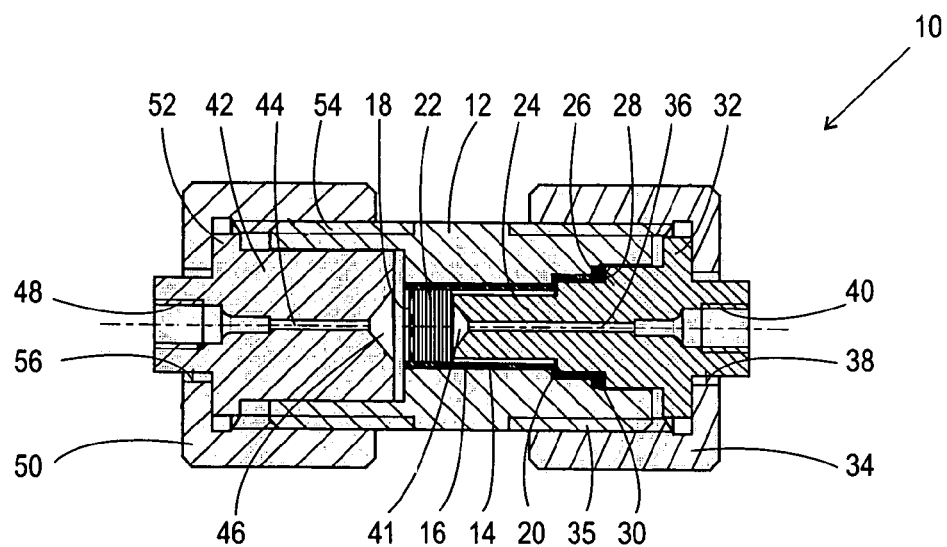
FIG. 3 shows a sectional representation of the membrane holder in FIG. 1 and FIG. 2 taken along the section line III-III in FIG. 2.

FIG. 3 shows a membrane holder 10 according to the invention in a sectional representation. The centerpiece of the membrane holder 10 is a housing body 12. In the present embodiment, the housing body 12 has a cylindrical outer contour. The housing body 12 encloses a reception space subdivided into two sections. The reception space's first section, lying on the right in FIG. 3, has a cylindrically stepped inner contour which corresponds to the likewise cylindrically stepped outer contour of a basket insert 14. A Vivapure™ insert is preferably used as the basket insert 14. The basket insert 14 has a liquid-tight wall 16 and a perforated bottom 18. The wall 16 of the basket insert bears leaktightly on the inner contour of the reception space, in which case a wall shoulder 20 resulting from the cylindrical stepping of the insert contour may be used in order to optimize the sealing in cooperation with a corresponding step of the reception space inner contour. A membrane stack 22, which consists of flat pieces of adsorber membrane material, is arranged on the bottom 18 of the insert 14, in which case all the layers of the membrane stack 22 may have the same or different binding properties. The membrane stack 22 is held in position by a brace element 24 and is preferably pressed against the bottom 18. The brace element 24 has a cylindrically stepped outer contour, which corresponds essentially to the stepped inner contour of the insert 14. In this way, on the one hand, it is possible to ensure leaktight seating of the brace element 24 in the insert 14. On the other hand, the free volume above the membrane stack 22 is minimized. The sealing between the brace element 24 and the insert 14 is carried out essentially by cooperation of a flange 26 on the upper edge of the insert 14, which corresponds to a shoulder 28 of the brace element. An additional sealing element 30, for example a silicone sealing ring, may be used between the flange 26 and the shoulder 28 in order to optimize the seal.

The brace element 24 protrudes with a flange 32 beyond the housing body 12. A housing cap designed as a union nut 34, which is screwed onto a screw-threaded section 35 of the housing body, is used in order to fix the brace element. With sufficient tensioning of the union nut 34, the brace element 24 is pressed via its flange 32 into the insert 14. This creates the seal between the insert 14 and the housing body 12 and the seal between the brace element 24 and the insert 14, as well as holding the membrane stack 22 in position and pressing it against the bottom 18.

A feed channel 36 passes through the brace element 24 and opens into a tube or hose connection 40 in the outer end region, passing through an opening 38 of the union nut 34, of the brace element 24. As shown in FIG. 3, the tube or hose connection 40 is produced by an inner screw thread into which a tube or hose adapter (not shown) can be screwed. At its other end, the feed channel 36 opens into a liquid distribution structure 41, which is designed as a conical recess in the embodiment represented.

A second brace element 42, through which a discharge channel 44 passes, is fitted in the second section of the reception space, following on from the bottom 18 of the insert 14, of the housing body 12. The discharge channel 44 opens at one end into a liquid manifold structure 46 designed as a conical recess, and at its other end into a tube or hose connection 48 which is designed as an inner screw thread 48 in the embodiment shown. The second brace element 42 is held in position by a second union nut 50, which can be screwed onto a further screw-threaded section 54 of the housing body 12. The union nut 50 cooperates with a flange 52 of the second brace element 42, which extends beyond the housing body. In this way, the brace element 42 is held in position while bearing leaktightly with its outer contour on the essentially cylindrical inner contour of the second section of the reception space. Other sealing means, for example a sealing ring enclosing the liquid manifold arrangement 46 annularly, may be provided as an alternative or in addition.

The second brace element 42 passes through the union nut 50 in the region of an opening 56.

As can be seen from the drawings and the description above, the membrane holder 10 according to the invention represents a favorable possibility for flow chromatography on a small scale, in which case standardly available components such as the insert 14 and cost-effectively manufacturable components such as the housing body 12 and the housing caps or union nuts 34, 50 can be used application-independently, while special brace elements 24, 42 can be used for adaptation to the height of the membrane stack 22, the requisite flow quantity or rate and the line connection standards.

Naturally, the embodiment shown in the figures and discussed in the scope of the special description represent only illustrative exemplary embodiments of the present invention. A wide range of possible variants are available to the person skilled in the art, particularly in respect of the specific form of the insert 14, the sealing variants and naturally the special choice of the membranes forming the membrane stack 22. Even though it is particularly suitable for membrane adsorber chromatography, the membrane holder according to the invention can also be used for other purposes such as for carrying out enzyme reactions with enzymes immobilized on the membranes.

What is claimed is:

1. A membrane holder for membrane adsorber chromatography comprising a housing body (12) with a reception space for at least one layer of adsorber membranes (22) and at least one first housing cap (34) for closing a first reception space opening, which can be fixed to the housing body (12), a liquid stream being introducible via first liquid guide means (36) through the first housing cap (34) and the first reception opening into the reception space, so that it passes through the adsorber membranes (22) and flows away through a second reception space opening, wherein the first housing cap (34) can be screwed as a first union nut onto the housing body (12) and a first brace element (24), which can be clamped between the first cap (34) and the housing body (12) via a flange (32) extending beyond the first reception space opening, can be fixed leaktightly in a basket-like insert (14) with a liquid-tight wall and a perforated bottom (18), which is used to receive the adsorber membranes (22), an outer contour of the basket-like insert (14) being fitted in a leaktight fashion onto an inner contour of the reception space.

2. The membrane holder as claimed in claim 1, wherein the basket-like insert (14) has a circumferential flange (26) on its upper edge facing away from the bottom, against which a corresponding shoulder (28) of the first brace element (24) exposed to force from the first housing cap (34) bears leaktightly.

3. The membrane holder as claimed in claim 2, wherein a sealing element (30) is arranged between the flange (26) and the shoulder (28) of the first brace element (24).

4. The membrane holder as claimed in claim 1, wherein a wall (16) of the basket-like insert (14) is designed as a hollow cylinder with a first, smaller cylinder diameter in a lower section, next to the perforated bottom (18), and as a hollow cylinder with a second, larger cylinder diameter in an upper section, which neighbors the lower section via a wall shoulder (20).

5. The membrane holder as claimed in claim 4, wherein a corresponding shoulder of the first brace element (24), exposed to force from the first housing cap (34), bears leaktightly against the wall shoulder (20).

6. The membrane holder as claimed in claim 1, wherein an outer end region of the first brace element (24) passes through the first housing cap (34) in the assembled state, and the first liquid guide means (36) pass in the form of a feed channel through the first brace element (24).

7. The membrane holder as claimed in claim 6, wherein the outer end region of the first brace element (24) has a tube or hose connection (40).

8. The membrane holder as claimed in claim 7, wherein an inner end region of the first brace element (24), facing away from the outer end region, has a liquid distribution structure (41) for distributing the introduced liquid stream over a substantial part of the adsorber membrane surface (22).

9. The membrane holder as claimed in claim 1, wherein the reception space has a second section following on from its first section receiving the basket-like insert (14), which is connected to the first section and into which a second brace element (42) can be fitted leaktightly, the second brace element (42) being clampable by means of a second housing (50), designed as a second union nut, which can be screwed onto the housing body in order to close the second reception opening, between the second housing cap (50) and the housing body (12) in cooperation with a flange (52) of the second brace element (42), which extends beyond the second reception space opening.

10. The membrane holder as claimed in claim 9, wherein an outer end region of the second brace element (42) passes through the second housing cap (50) in the assembled state, and second liquid guide means (44) pass in the form of a discharge channel (44) through the liquid brace element (42).

11. The membrane holder as claimed in claim 10, wherein the outer end region of the second brace element (42) has a tube or hose connection (48).

12. The membrane holder as claimed in claim 11, wherein an inner end region of the second brace element (42), facing away from the outer end region, has a liquid manifold structure (46) for collecting the liquid emerging from the adsorber membrane surface (22).

* * * * *